(12) United States Patent
Baloga et al.

(10) Patent No.: US 7,300,113 B2
(45) Date of Patent: Nov. 27, 2007

(54) CHILD'S BOOSTER SEAT

(76) Inventors: Thomas Charles Baloga, 700 Beacon Knoll La., Fort Mill, SC (US) 29715; Adrian Simms, 1234 Smallstown Rd., Winsboro, SC (US) 29180

( * ) Notice: Subject to any disclaimer, the term of this patent is extended or adjusted under 35 U.S.C. 154(b) by 343 days.

(21) Appl. No.: 10/834,724

(22) Filed: Apr. 29, 2004
(Under 37 CFR 1.47)

(65) Prior Publication Data
US 2005/0012372 A1    Jan. 20, 2005

Related U.S. Application Data

(60) Provisional application No. 60/466,514, filed on Apr. 29, 2003.

(51) Int. Cl.
*A47D 1/10* (2006.01)
*A47D 15/00* (2006.01)
*B60N 2/26* (2006.01)

(52) U.S. Cl. .............. 297/468; 297/256.16; 297/250.1; 297/411.32

(58) Field of Classification Search ............ 297/250.1, 297/256.16, 411.32, 468
See application file for complete search history.

(56) References Cited

U.S. PATENT DOCUMENTS

| 4,461,510 | A | | 7/1984 | Cunningham et al. |
| 4,591,208 | A | * | 5/1986 | McDonald et al. ......... 297/487 |
| 4,687,255 | A | | 8/1987 | Klanner et al. |
| 4,854,639 | A | * | 8/1989 | Burleigh et al. ......... 297/250.1 |
| 5,186,520 | A | * | 2/1993 | Whitaker et al. ........... 297/468 |
| 5,579,561 | A | * | 12/1996 | Smith et al. .................. 24/170 |
| 5,678,887 | A | | 10/1997 | Sher |
| 5,842,740 | A | * | 12/1998 | Lefranc .................... 297/250.1 |
| 5,845,968 | A | | 12/1998 | Lovie |
| 6,322,143 | B2 | * | 11/2001 | Kassai et al. ............ 297/250.1 |
| 6,382,722 | B2 | | 5/2002 | Burleigh |
| 6,695,400 | B2 | * | 2/2004 | Washizuka et al. ......... 297/130 |
| 6,705,675 | B1 | | 3/2004 | Eastman et al. |
| 6,908,151 | B2 | * | 6/2005 | Meeker et al. ........... 297/250.1 |
| 2001/0008349 | A1 | | 7/2001 | Yamazaki |
| 2002/0000744 | A1 | | 1/2002 | Maciejczyk |
| 2002/0017808 | A1 | | 2/2002 | Kain |
| 2002/0074835 | A1 | | 6/2002 | Chalender |
| 2002/0145318 | A1 | | 10/2002 | Asbach et al. |
| 2002/0167214 | A1 | | 11/2002 | Nelson et al. |
| 2002/0171275 | A1 | | 11/2002 | Kain |

* cited by examiner

*Primary Examiner*—David Dunn
*Assistant Examiner*—Tania Abraham
(74) *Attorney, Agent, or Firm*—Adams Evans P.A.

(57) ABSTRACT

A booster seat, including a seat bottom for being supported on an upper surface of a vehicle seat, with first and second latches carried by respective lateral first and second sides of the seat bottom for securing the seat bottom to the upper surface of the vehicle seat by a vehicle seat belt. Each of the first and second latches comprises a bottom latch member and a top latch member. The bottom latch member and the top latch member are movable relative to each other between an open, seat belt insertion position and a closed clamping position for receiving and clamping a seat belt extended laterally across the seat bottom and the lap of the seat occupant, thereby securing the booster seat and the seat occupant to the upper surface of the vehicle seat.

9 Claims, 15 Drawing Sheets

CHILD'S BOOSTER SEAT

This application claims the benefit of the filing date of U.S. Provisional Patent Application No. 60/466,514, filed on Apr. 29, 2003.

TECHNICAL FIELD AND BACKGROUND OF THE INVENTION

This invention relates to a booster seat of the type that enables a child to use an adult vehicle seat belt. The design of the booster seat provides enhanced performance in the event of an accident. In a frontal impact on the vehicle, the inertia load of the booster seat is applied directly to the lap strap instead of being applied to the lap strap via the child's body. Also, in the event of a side impact, lateral displacement of the booster seat relative to the anchoring points of the adult vehicle seat belt is resisted by the lap strap portion of the seat belt.

SUMMARY OF THE INVENTION

Therefore, it is an object of the invention to provide a child's booster seat that provides enhanced protection to the seat occupant.

It is another object of the invention to provide a child's booster seat that provides a secure attachment of the booster seat onto a vehicle seat by means of the vehicle seat belt.

It is another object of the invention to provide a child's booster seat that directs a frontal inertia load directly to the lap strap of a vehicle seat belt rather than through the seat occupant.

It is another object of the invention to provide a child's booster seat that resists lateral displacement in the event of a side impact against the vehicle.

It is another object of the invention to provide a child's booster seat that combines the advantages referenced above with other desirable features that contribute to the safety and comfort of the seat occupant.

These and other objects of the present invention are achieved in the preferred embodiments disclosed below by providing a booster seat, comprising a seat bottom for being supported on an upper surface of a vehicle seat, with first and second latches carried by respective lateral first and second sides of the seat bottom for securing the seat bottom to the upper surface of the vehicle seat by a vehicle seat belt. Each of the first and second latches comprises a bottom latch member and a top latch member. The bottom latch member and the top latch member are movable relative to each other between an open, seat belt insertion position and a closed clamping position for receiving and clamping a seat belt extended laterally across the seat bottom and the lap of the seat occupant, thereby securing the booster seat and the seat occupant to the upper surface of the vehicle seat.

According to one preferred embodiment of the invention, each of the first and second latches have an upwardly-facing concave surface and a downwardly-facing convex surface for clamping the vehicle seat belt therebetween.

According to another preferred embodiment of the invention, the bottom latch member has a raised ridge extending along an upper surface thereof and the top latch member has a complementary channel extending along a lower surface thereof for receiving the seat belt therebetween with the ridge positioned in the channel and the seat belt clamped therebetween in a deformed, serpentine configuration for providing enhanced resistance against movement of the seat belt relative to the seat bottom.

According to yet another preferred embodiment of the invention, at least one or the other of the ridge or channel have teeth positioned thereon for engaging the seat belt clamped therein to provide further resistance against movement of the seat belt relative to the seat bottom.

According to yet another preferred embodiment of the invention, a lock is provided for locking the bottom latch member and the top latch member together in the closed clamping position.

According to yet another preferred embodiment of the invention, the lock comprises a locking extension carried by the upper latch member and a locking extension receiving opening in the seat bottom for releasably receiving and retaining the locking extension therein.

According to yet another preferred embodiment of the invention, a seat back is carried by the seat bottom.

According to yet another preferred embodiment of the invention, the seat includes first and second arm rests carried by respective lateral first and second sides of the seat bottom and in vertically spaced-apart relation to the respective first and second latches.

According to yet another preferred embodiment of the invention, the bottom latch member is stationary and the upper latch member is mounted for pivotal movement relative to the bottom latch member between the open and closed positions.

According to yet another preferred embodiment of the invention, the locking extension includes a detent thereon positioned for providing an interference locking engagement with an edge of the seat bottom defining the extension receiving opening in the seat bottom when the bottom latch member and the top latch member together are locked together in the closed seat belt clamping position.

According to yet another preferred embodiment of the invention, a lock release handle is carried by the top latch member for manual release of the top latch member from the bottom latch member.

According to yet another preferred embodiment of the invention, a booster seat is provided, and comprises a seat bottom for being supported on an upper surface of a vehicle seat, and first and second latches carried by respective lateral first and second sides of the seat bottom for securing the seat bottom to the upper surface of the vehicle seat by a vehicle seat belt. Each of the first and second latches comprises a bottom latch member and a top latch member. The bottom latch member and the top latch member are movable relative to each other between an open, seat belt insertion position and a closed clamping position for receiving and clamping a seat belt extended laterally across the seat bottom and the lap of the seat occupant, thereby securing the booster seat and the seat occupant to the upper surface of the vehicle seat. A seat back is mounted on the seat bottom for providing support to the back of the seat occupant and a head rest is mounted on the seat back and extends upwardly above the seat back for providing support to the head and neck of the seat occupant.

According to yet another preferred embodiment of the invention, the head rest is mounted for incremental vertical adjustment relative to the seat back.

According to yet another preferred embodiment of the invention, first and second laterally-spaced arm rests are carried by the seat bottom above respective first and second latches.

According to yet another preferred embodiment of the invention, the first and second arm rests are pivotally mounted for movement between a lowered, horizontal use position and a raised seat belt access position.

According to yet another preferred embodiment of the invention, the seat bottom and the first and second lower latch members are integrally formed.

According to yet another preferred embodiment of the invention, the first and second arm rests are pivotally mounted on the seat bottom.

According to yet another preferred embodiment of the invention, a booster seat is provided that comprises a seat bottom for being supported on an upper surface of a vehicle seat. The seat bottom has a seat cushion and a removable seat cover positioned over the seat cushion. First and second latches are carried by respective lateral first and second sides of the seat bottom for securing the seat to the upper surface of the vehicle seat by a vehicle seat belt. Each of the first and second latches have a bottom latch member and a top latch member. The bottom latch member has a raised ridge extending along an upper surface thereof, and the top latch member has a complementary channel extending along a lower surface thereof for receiving the seat belt therebetween with the ridge positioned in the channel and the seat belt clamped therebetween in a deformed, serpentine configuration for providing enhanced resistance against movement of the seat belt relative to the seat. The bottom latch member and the top latch member are movable relative to each other between an open, seat belt insertion position and a closed clamping position for receiving and clamping a seat belt extended laterally across the seat bottom and the lap of the seat occupant, thereby securing the booster seat and the seat occupant to the upper surface of the vehicle seat. A seat back is pivotally mounted on the seat bottom for providing support to the back of the seat occupant, and a head rest is mounted on the seat back and extends upwardly above the seat back for providing support to the head and neck of the seat occupant.

According to yet another preferred embodiment of the invention, first and second belt guides are carried on opposing lateral sides of the head rest for receiving and guiding a diagonally-extending shoulder seat belt strap across the torso of the seat occupant.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
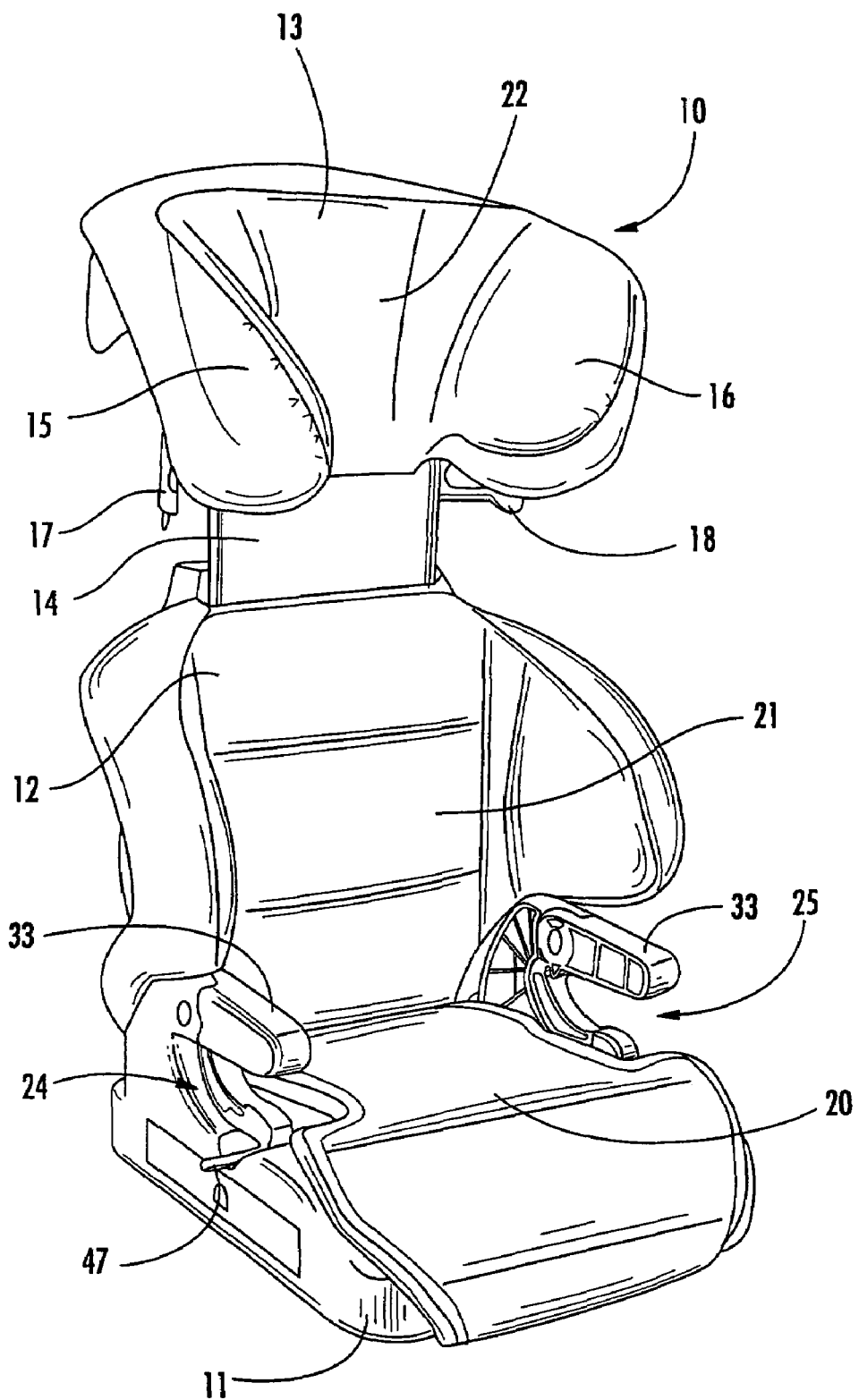
FIG. 1 is a perspective view of the child's booster seat according to an embodiment of the invention.

Referring now specifically to the drawings, a child's booster seat according to the present invention is illustrated in FIG. 1 and shown generally at reference numeral 10. The seat 10 is preferably comprised of a seat bottom 11, a seat back 12 and a head rest 13. The head rest 13 is mounted on an adjustable slide member 14 carried by the seat back 12 and includes head rest side restraints 15,16. The head rest 13 also includes seat belt guides 17 and 18 for positioning and guiding the shoulder portion of the vehicle seat belt. Relevant aspects of the seat bottom are likewise applicable to seats with only a seat bottom and no seat back or headrest.

Removable seat bottom, seat back and head rest covers 20, 21, 22, respectively provide a colorful appearance to the seat 10 and permit cleaning or replacement when needed.

Figure 2:
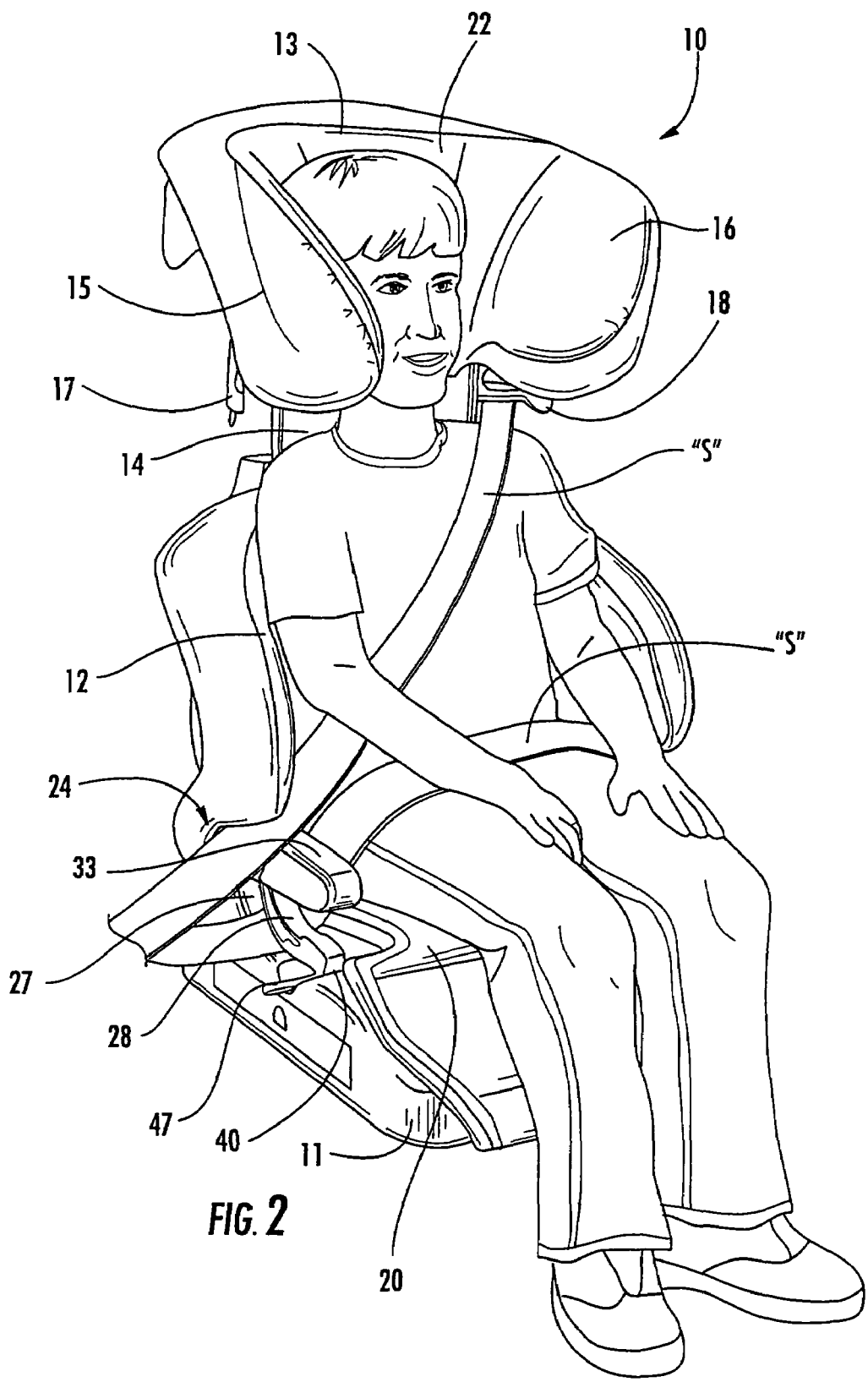
FIG. 2 is a perspective view of the child's booster seat shown in FIG. 1 with an occupant seated thereon.

As is also shown generally in FIGS. 1 and 2, two latches 24, 25 are provided for latching the seat 10 to the vehicle seat on which it rests and to simultaneously secure the child into the seat 10 by utilizing the seat belt "S" of the vehicle. The design and function of the latches 24 and 25 are more fully described in the following description of FIGS. 2-6. The description follows with reference to the right-hand latch 24, it being understood that the design and function of the left-hand latch 25 is identical.

Figure 3:
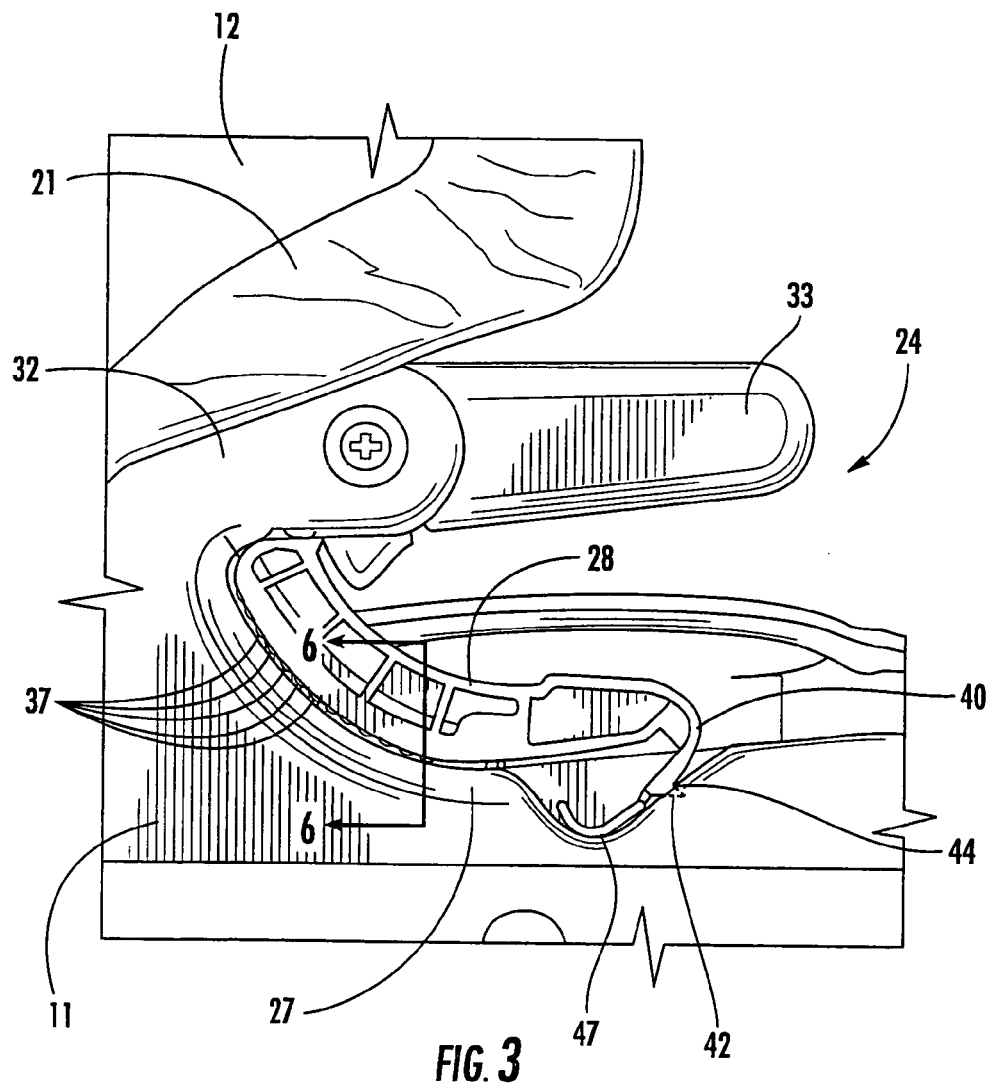
FIG. 3 is a fragmentary side elevation of the seat belt latch of the seat in the closed position, with the seat belt omitted for clarity.

Latch 24 includes a bottom latch member 27 and a top latch member 28 that are movable relative to each other between a closed, seat belt clamping position, FIG. 3, and an open seat belt insertion position for receiving guiding and clamping the seat belt "S" extending laterally across the seat bottom 11 and the lap of the seat occupant. The seat belt "S" is extended from the corner attachment position of the vehicle and passed through the appropriate belt guide 17 or 18. In the configuration shown in FIG. 2, the booster seat is on the right hand side of the vehicle so the seat belt "S" is extended through the belt guide 18 and diagonally across the torso of the seat occupant, with the lap portion of the seat belt "S" extending laterally across the lap of the seat occupant and locked into place by the latches 24 and 25, thereby securing the seat 10 and the seat occupant to the upper surface of the vehicle seat, as shown in FIG. 2.

Figure 6:
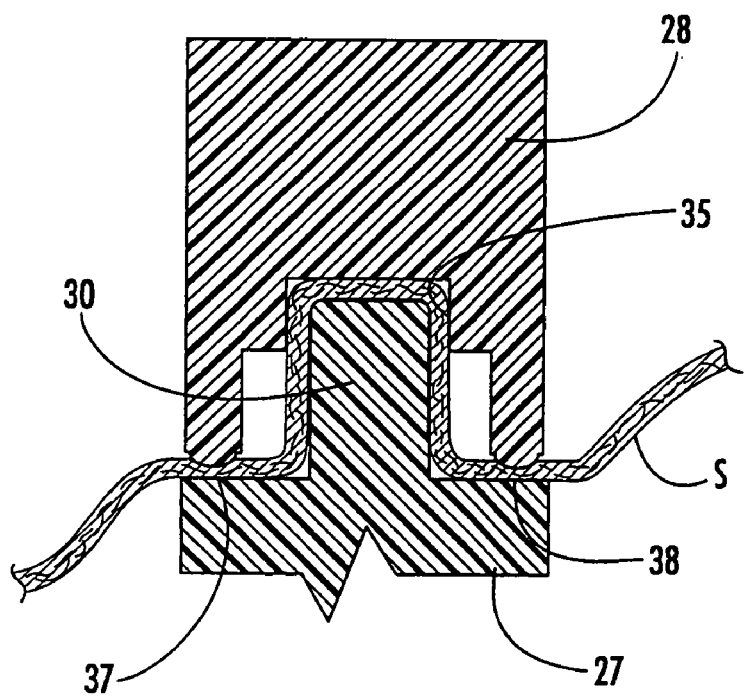
FIG. 6 is a vertical cross-section taken along lines 6--6 of FIG. 3 showing the manner in which the seat belt is clamped into the latch.
Figure 7:
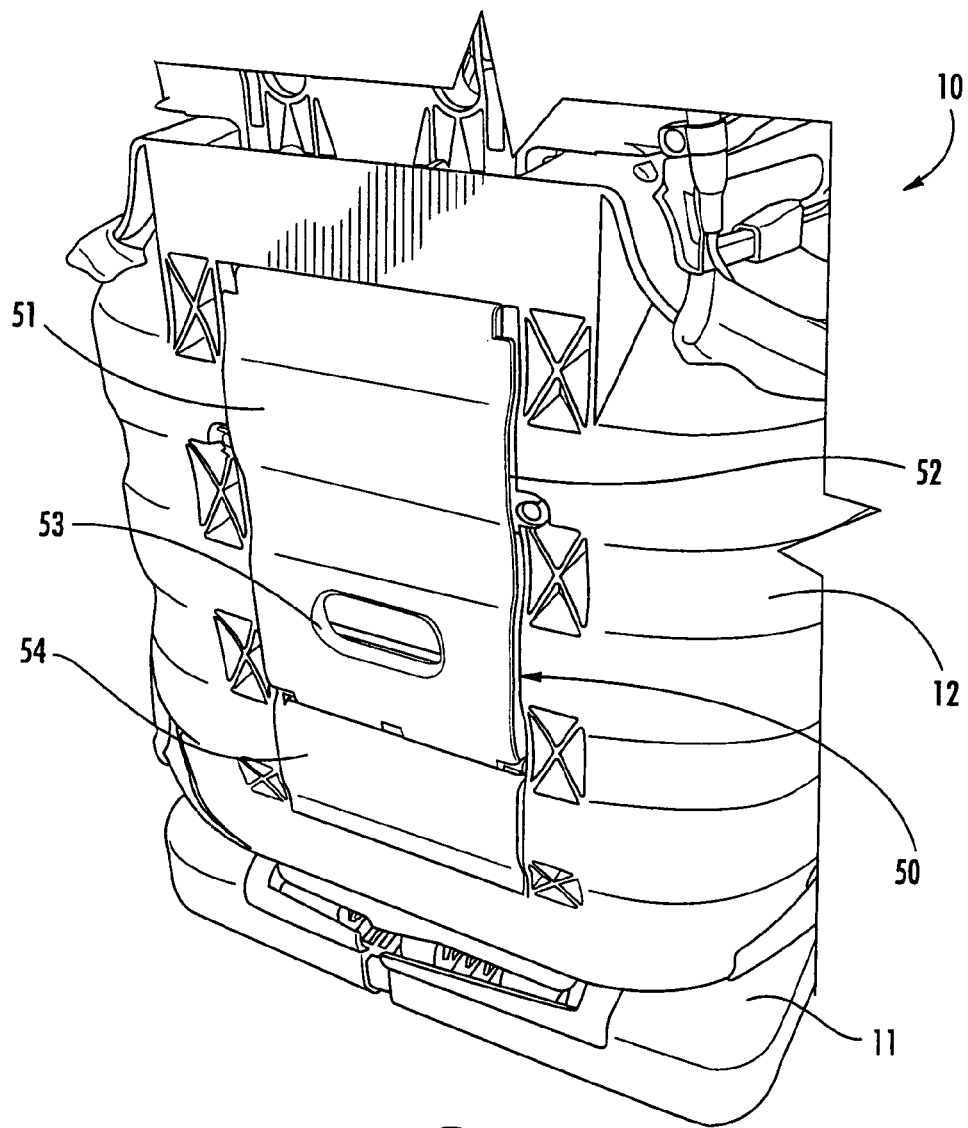
FIG. 7 is a fragmentary perspective view of the posterior aspect of the seat back.
Figure 8:
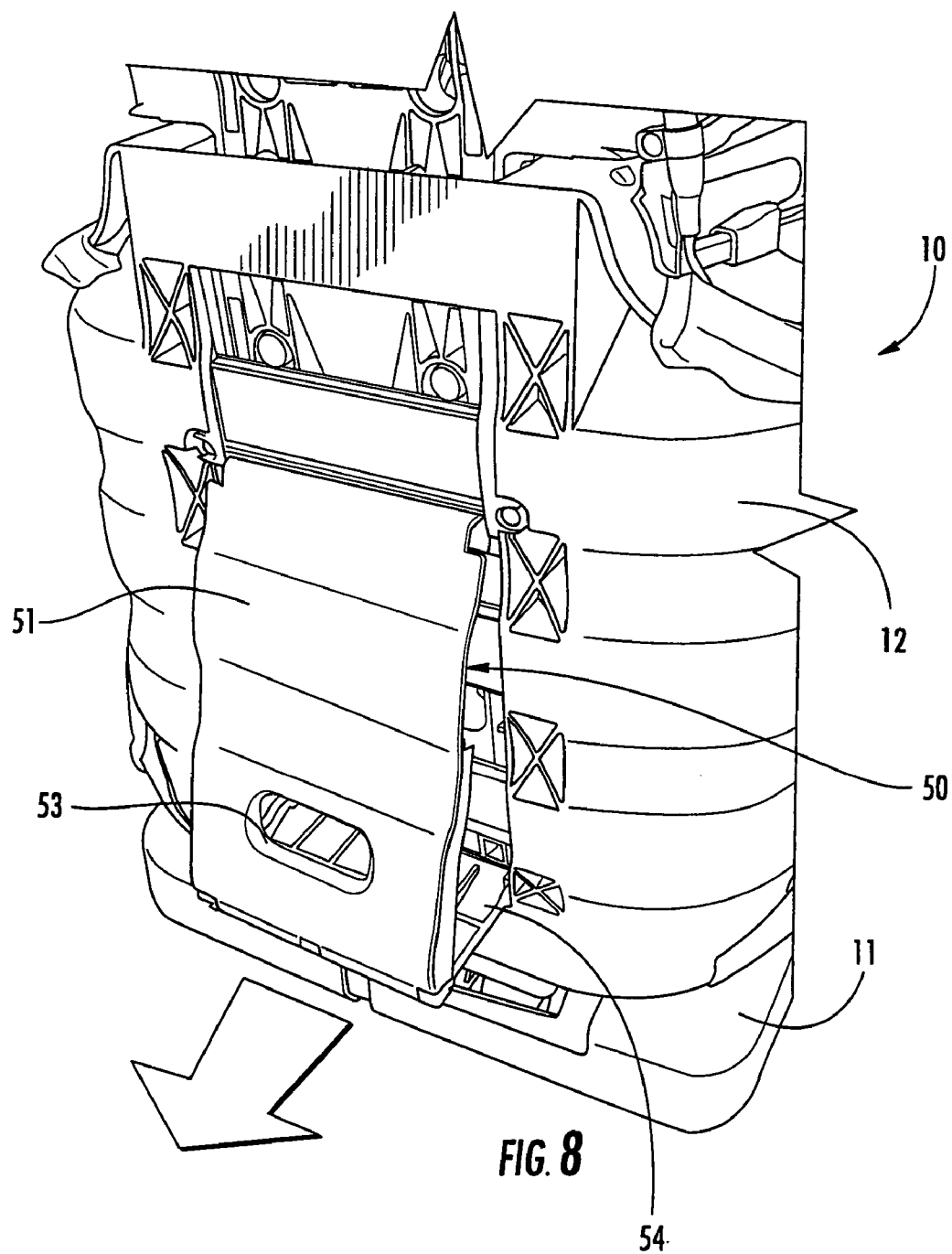
FIGS. 8 and 9 are fragmentary perspective and side elevation views, respectively, of the seat back of FIG. 7 showing the seat back in the recline position.

Bottom latch member 27 includes a raised, concave ridge 30 extending along the side of the seat bottom 11. Top latch member 28 is pivotally mounted to a pivot extension 32 and is integrally-formed with an arm rest 33 that thus pivots with the top latch member 28 so that the arm rest 33 is in a lowered, use position when the latch 24 is locked and in a raised, belt access position when the latch 24 is unlocked. This facilitates passage of the lap strap portion of the vehicle seat belt across the lap of the seat occupant and into the latches 24, 25. The top latch member 28 has a convex channel 35, see FIG. 6, configured to deform the seat belt over the ridge 30 of the bottom latch member 27. The channel 35 is sized to permit a conventional seat belt to be fitted into the channel 35 along with the ridge 30 in a "press fit" condition. As is shown in FIG. 6, the seat belt is clamped between the top and bottom latch members 27,28 in a deformed, serpentine configuration for providing enhanced resistance against movement of the seat belt "S" relative to the seat bottom 11.

An added measure of clamping force and resistance to movement of the seat belt "S" relative to the latch 24 is provided by rows of teeth 37, 38 extending along the edges of the top latch member 28 defining the channel 35. The teeth 37, 38 further deform the seat belt "S", and increase the engaged surface area between the top and bottom latch members 27, 28, thereby further resisting lateral movement of the seat belt "S".

Figure 4:
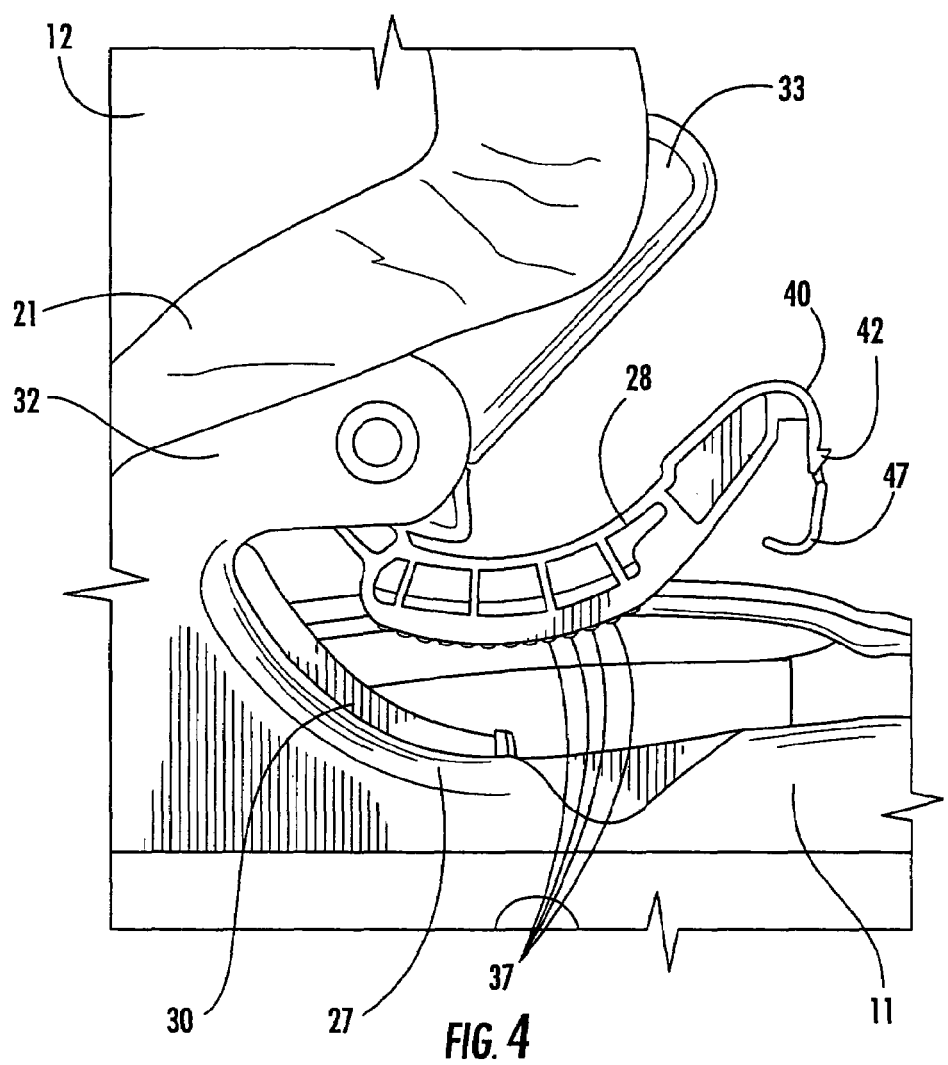
FIG. 4 is a fragmentary side elevation of the seat belt latch of the seat showing the latch in the open position.
Figure 5:
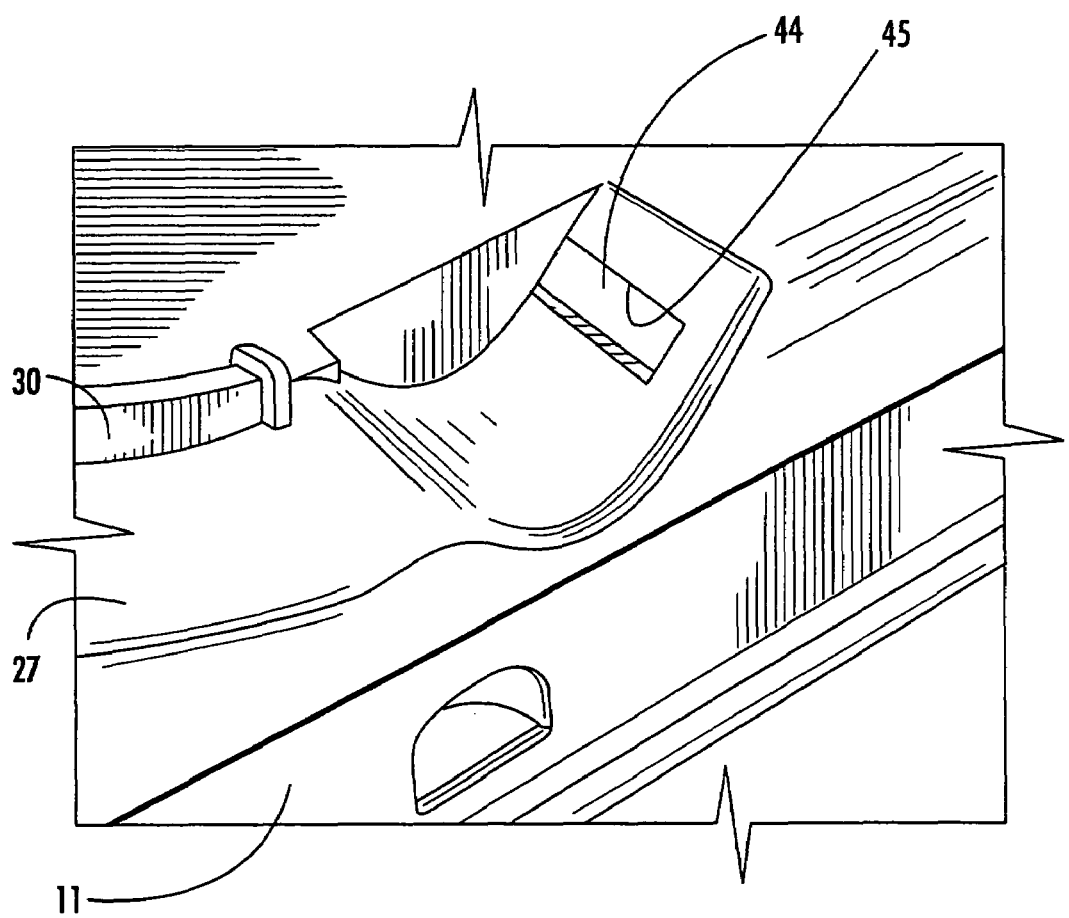
FIG. 5 is a close-up view of the tab receiving opening of the lock.
Figure 5A:
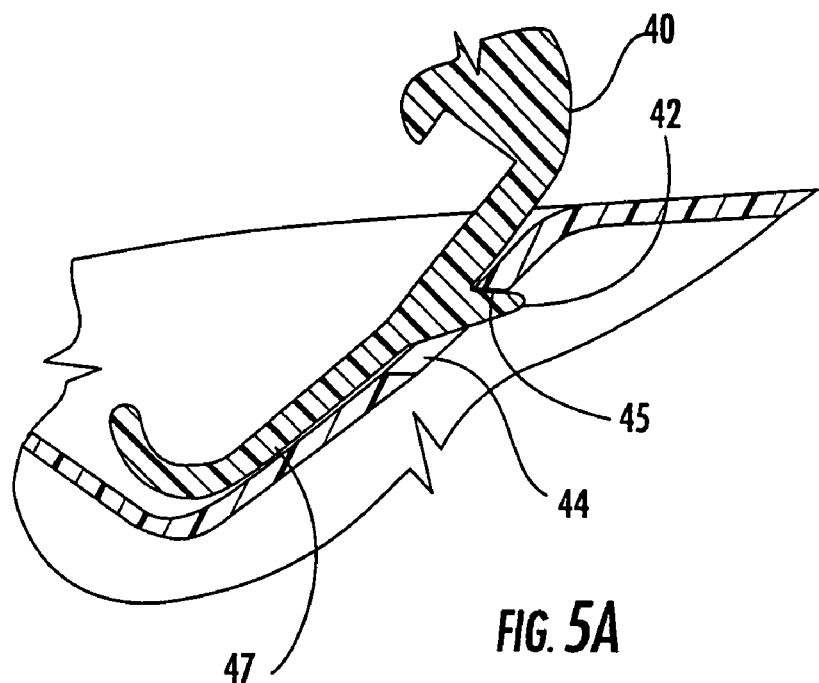
FIG. 5A is a fragmentary cross-section of the lock.

As is best shown in FIGS. 3, 4 and 5, a lock is provided for locking the bottom latch member 27 and the top latch member 28 together in the closed clamping position. The distal end of the top latch member 28 includes an extension 40 carrying an integrally-formed detent 42 that projects outwardly away from the top latch member 28. To clamp the seat belt "S" into the latch 24, the top latch member 28 is pressed downwardly against the seat belt "S", draped over the ridge 30 of the bottom latch member 27, using the arm rest 33 to exert the required downward pressure. When the top latch member 28 reaches the full extent of travel, the detent 42 extends into an extension receiving opening 44 and is caught by the forward edge 45 of the extension receiving opening 44, as shown in FIG. 3. The geometry of the design is such that a frontal impact will tend to drive the extension 40 and the detent 42 thereon further into the receiving opening 44, decreasing the possibility that the latch 24 will unlock due to the impact.

The seat belt "S" is released by pressing down on the distal end a lock-off release tab 47.

To install the booster seat 10, the seat 10 is placed in a vehicle seating position equipped with a lap-shoulder seat belt, such as the front passenger seat or the left or right outboard rear seats of a passenger vehicle. The seat 10 is positioned with the back rest 12 flat against the back rest of the vehicle seat. With the child properly seated in the seat 10, both of the arm rests 33 are raised to expose the space between the bottom latch member 27 and the top latch member 28. After verifying that the seat belt "S" is not twisted, the lap portion of the seat belt "S" is placed under both the left and right top latch members 28 and across the bottom latch member 27. The seat belt "S" is then buckled into the seat belt buckle (not shown) of the vehicle.

The shoulder portion of the seat belt "S" is then positioned over the arm rest 33 closest to the seat belt buckle, then through the belt guide 18 of the headrest 13 on the opposite side of the seat 10. Any slack is removed from the lap portion of the seat belt "S", and then from the shoulder portion so as to provide a comfortable but snug fit to the seat occupant. Both arm rests 33 are then pushed down into the latched position shown in FIGS. 2, 3 and 6.

After these initial steps, it is only necessary to release the lock-off release tab 47 closest to the seat belt buckle, for example, the right side as shown in FIG. 2, and unbuckle the vehicle seat belt "S" to allow the occupant to exit the seat 10. The other side remains latched. When the occupant re-enters the seat 10, the lap portion of the seat belt "S" is re-latched on the right side as described above to properly secure the occupant in the seat.

Other features of the seat 10 that provide further safety and comfort include seat recline support 50, as shown in FIGS. 7-10. Recline support 50 comprises a panel 51 that slides in a recess 52 on the posterior aspect of the seat back 12. The panel 51 includes a hand hold opening 53 to facilitate operation. A pivot panel 54 is pivotally attached to the bottom edge of the panel 51 and slides in the recess 52. The panel 51 is moveable between a seat back upright position shown in FIGS. 7 and 10, and a seat back recline position shown in FIGS. 8 and 9.

Figure 9:
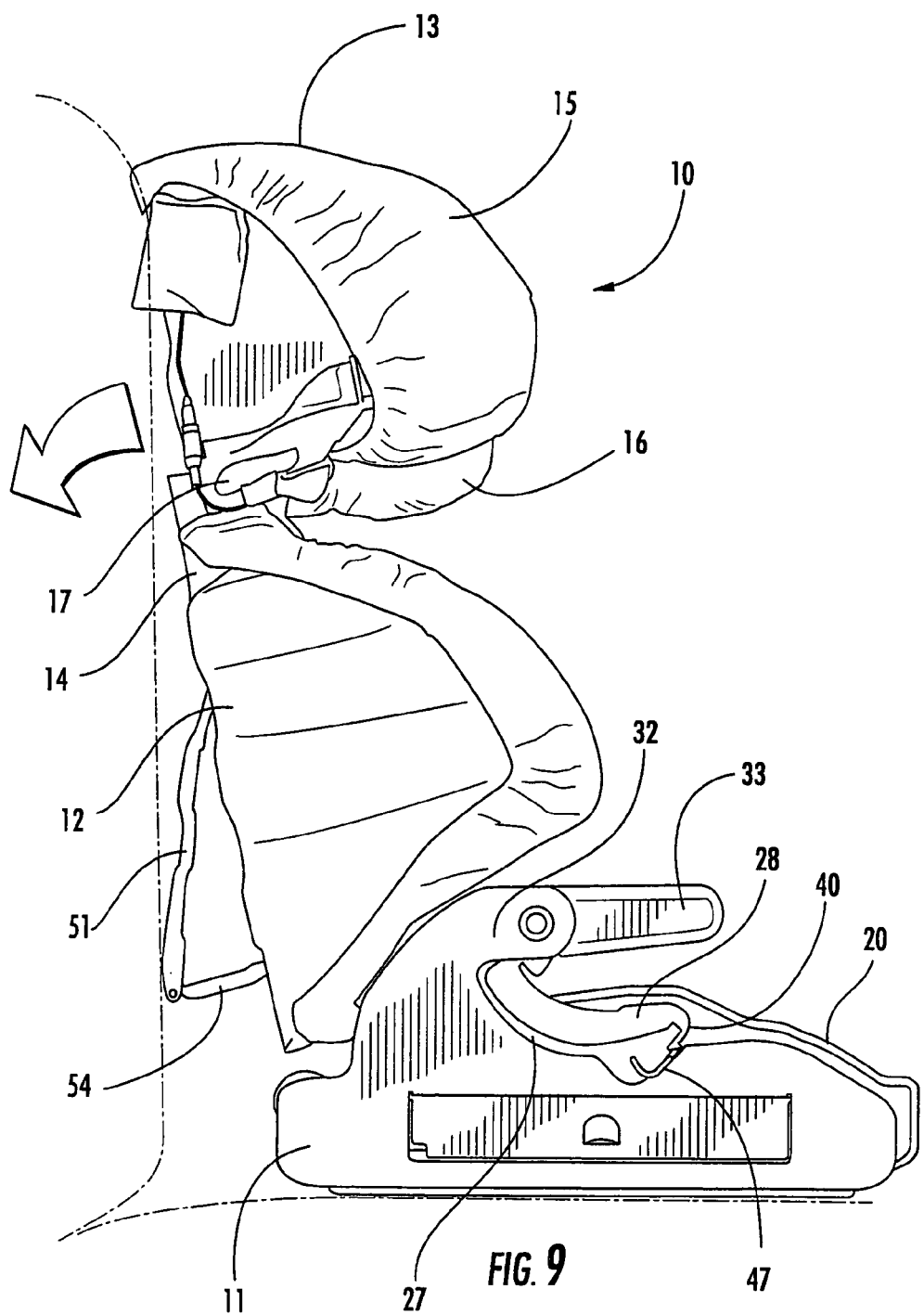
Figure 10:
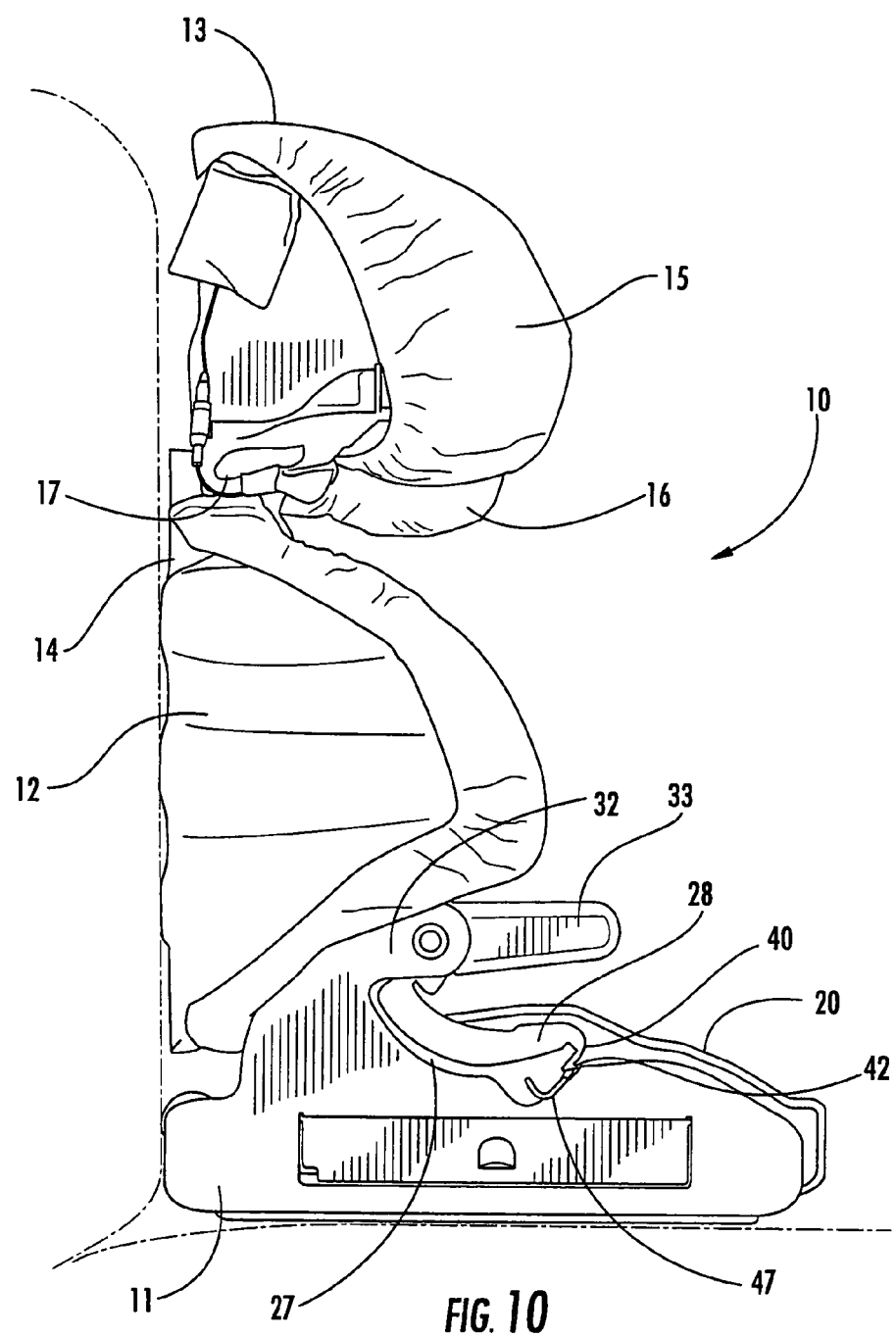
FIG. 10 is a side elevation showing the seat back in the upright position.

As is evident from comparison between FIGS. 9 and 10, the recline support 50 provides support and rigidity to the seat back 12 by bracing the lower part of the seat back 12 against a vehicle seat back.

FIGS. 11-14 illustrate that the width of the seat bottom 12 can be adjusted as needed to provide a more secure and comfortable fit for the seat occupant. The underside of the seat bottom 12 comprises a pair of seat bottom adjustment panels 60, 61 that are mounted to slide relative to each other.

Sliding motion of the adjustment panels 60, 61 relative to each other is controlled at the front of the seat by a pair of large buttons 64, 65 that are captured in respective lateral slots 66, 67 in adjustment panels 60, 61, respectively. These buttons 64, 65 also retain the seat bottom cover 20 in a tensioned condition on the seat bottom 12 through button holes 68 in the seat bottom cover 20.

Figure 11:
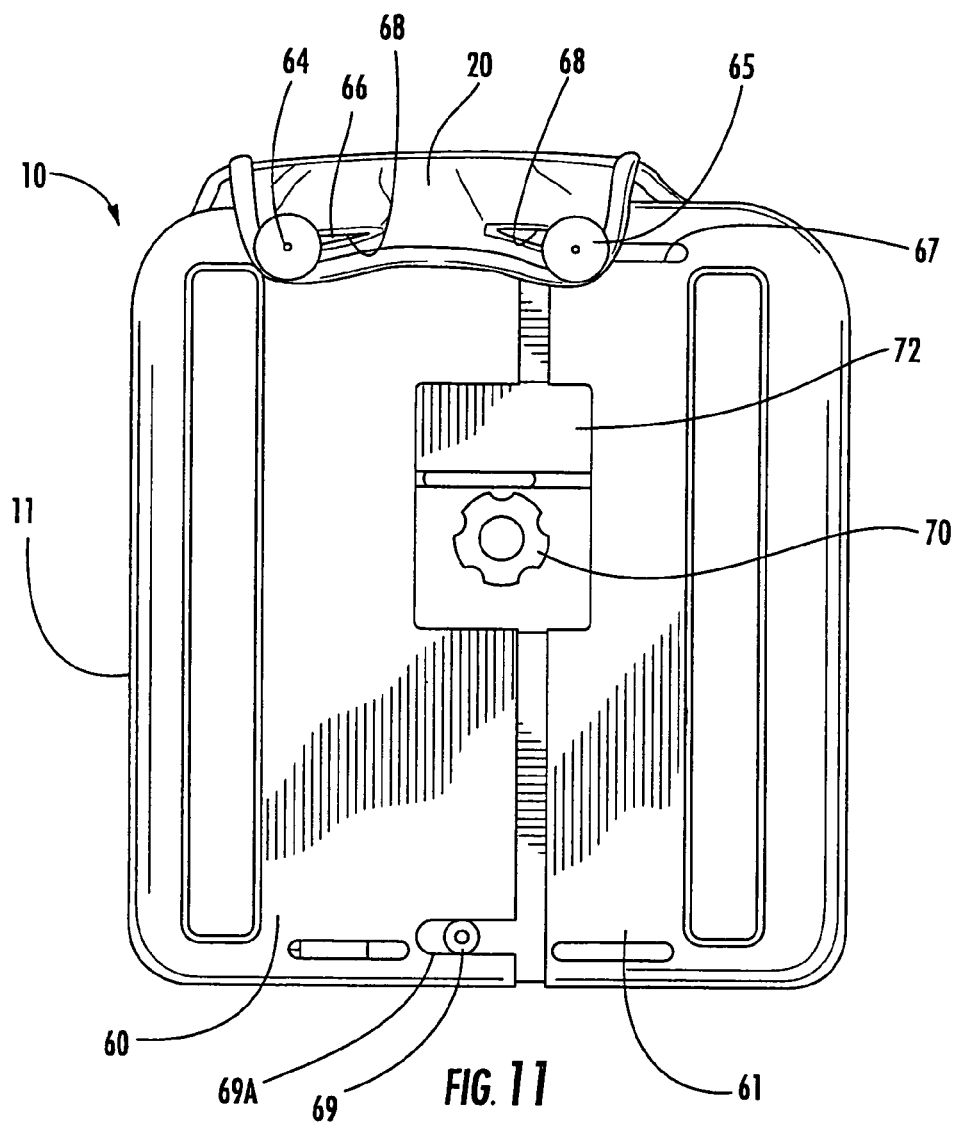
FIGS. 11-14 are fragmentary views showing adjustment of the width of the seat bottom.
Figure 12:
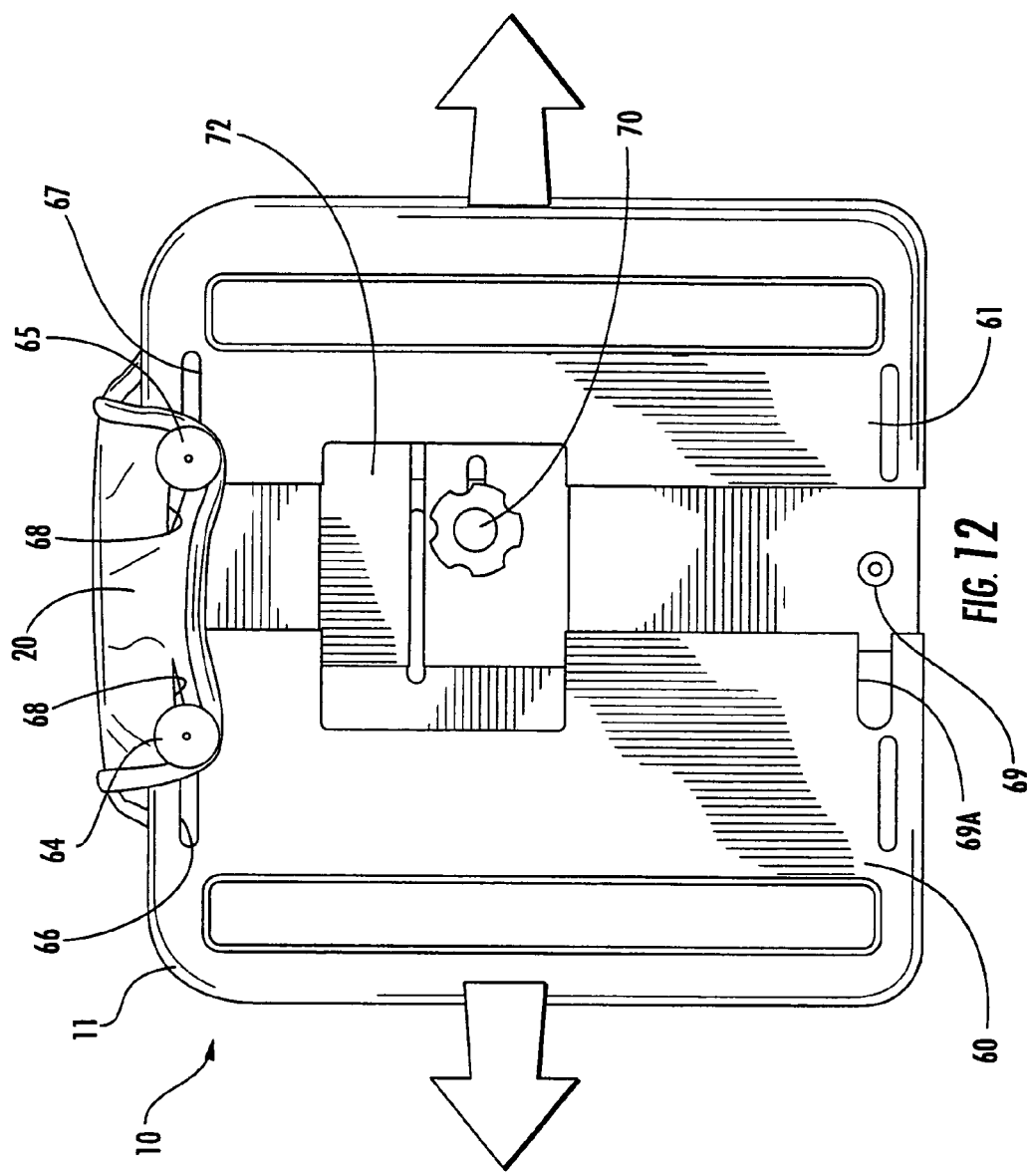
Figure 13:
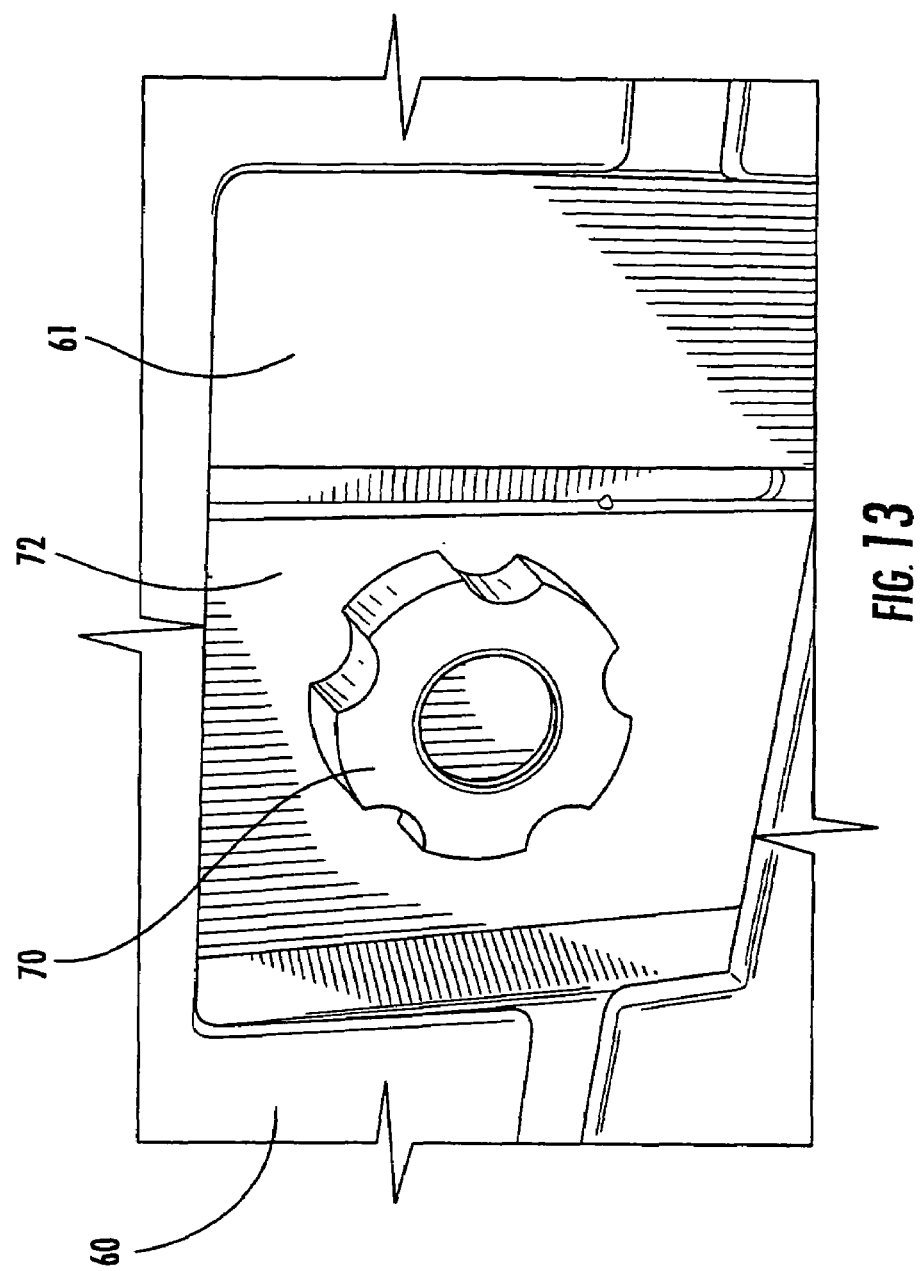

Sliding motion of the adjustment panels 60, 61 is controlled at the rear of the seat bottom 12 by a pin 69 on the adjustment panel 61 captured in the narrower configuration shown in FIG. 11 in an elongate slot 69A in the adjustment panel 60. A threaded adjustment knob 70, see FIG. 13, is mounted for rotation on the adjustment panel 60. Counterclockwise rotation loosens the knob 70 relative to the adjustment panel 60 and clockwise rotation tightens the knob 70 relative to adjustment panel 60. A pressure plate 72 is mounted under the knob 70 and applies pressure to both the adjustment panel 60 and adjustment panel 61 as the knob 70 is turned clockwise.

Figure 14:
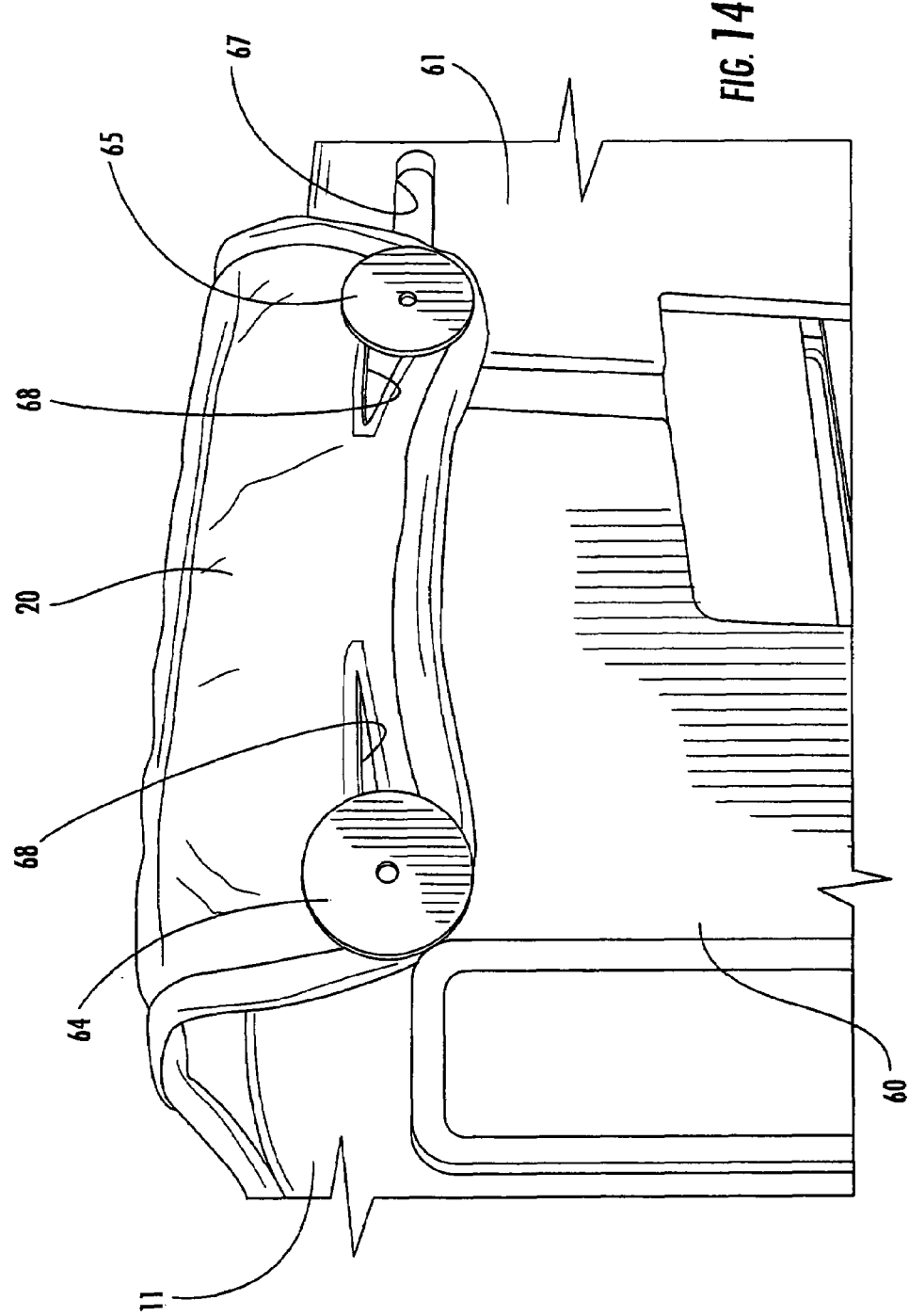

Adjustment is accomplished by determining the current seat bottom width relative to the size of the seat occupant, inverting the seat 10 to expose the underside of the seat bottom 11, and turning the knob 70 counterclockwise to loosen the pressure plate 72. When the knob 70 has been turned sufficiently to permit the adjustment panels 60, 61 to slide, the adjustment panels 60, 61 are moved together or apart so that the seat bottom 11 is snug against the seat occupant's hips. See FIG. 12. The knob 70 is re-tightened to lock the adjustment panels 60, 61 in the new position. As is shown in FIG. 14, the button holes 68 are sufficiently elongate to allow a full range of adjustment without interference with the cover 20.

Figure 15:
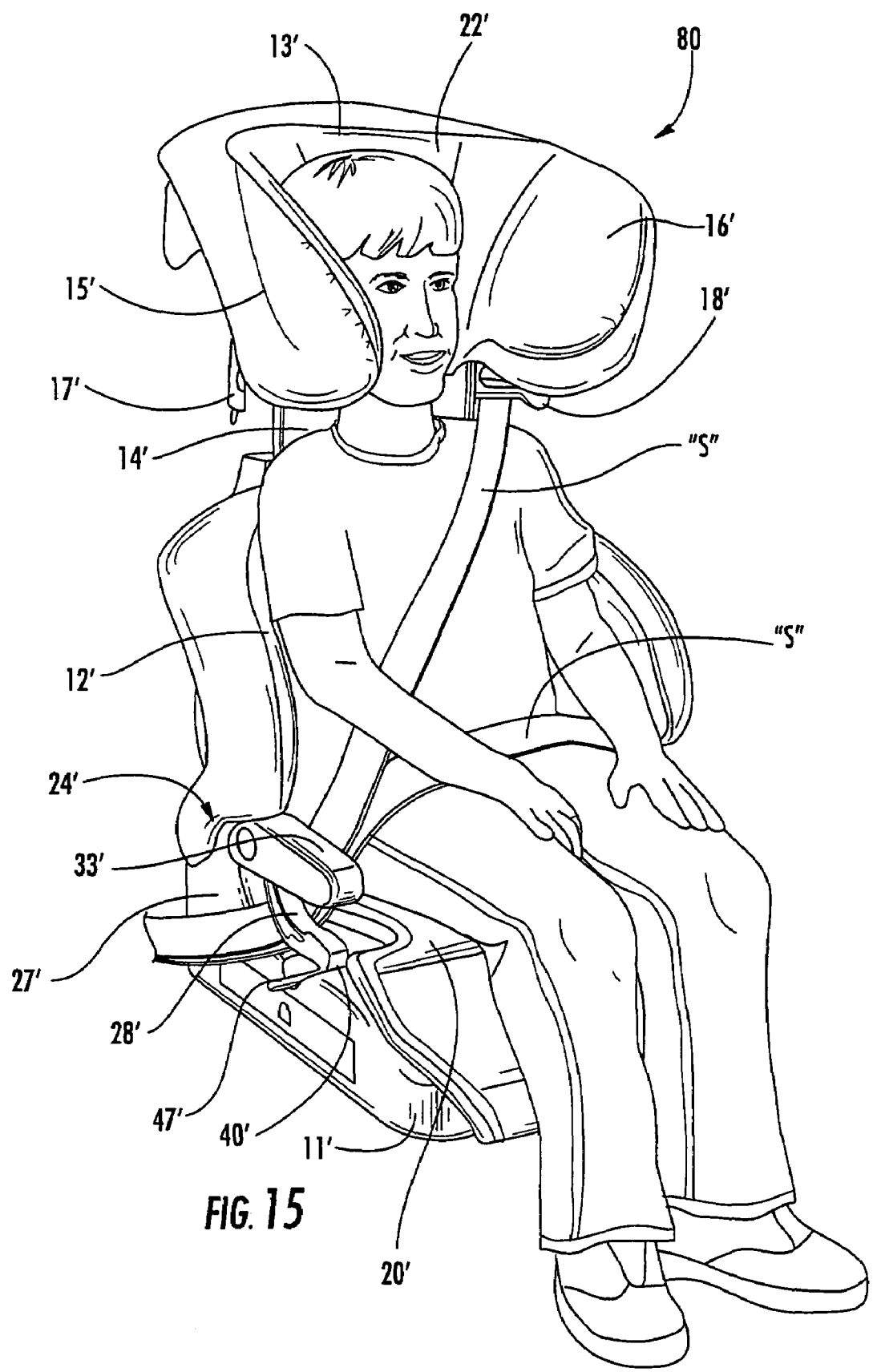
FIG. 15 is an alternative embodiment showing both the lap and shoulder portions of the seat belt passing between and being locked by the latch members.

Referring now to FIG. 15, where like elements are shown in prime notation, an alternative embodiment shows that both the lap and shoulder portions of the seat belt "S" are routed and locked between the top and bottom latch members 27' and 28'. In such a construction, additional spacing would be provided between the convex channel 35 and the ridge 30 of the bottom latch member 27' to allow for two thicknesses of the seat belt "S".

A child's booster seat is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A booster seat, comprising:
   (a) a seat bottom for being supported on an upper surface of a vehicle seat;
   (b) first and second latches carried by respective lateral first and second sides of the seat bottom for securing the seat bottom to the upper surface of the vehicle seat by a vehicle seat belt, each of the first and second latches comprising:
(I) a bottom latch member;
(ii) a top latch member;
(iii) an upwardly-facing surface and a downwardly-facing surface for clamping the vehicle seat belt therebetween;
(c) the bottom latch member and the top latch member being movable relative to each other between an open position and a closed position for receiving and clamping a seat belt extended laterally across the seat bottom and the lap of the seat occupant, thereby securing the booster seat and the seat occupant to the upper surface of the vehicle seat;
(d) a lock for locking the bottom latch member and the top latch member together in the closed position, the lock comprising a locking extension carried by the top latch member and a locking extension receiving opening in the seat bottom for receiving and releasably retaining the locking extension therein;
(e) wherein the locking extension includes a detent thereon positioned for providing an interference locking engagement with an edge of the seat bottom defining the extension receiving opening in the seat bottom when the bottom latch member and the top latch member are locked together in the closed position.

2. A booster seat according to claim 1, wherein the bottom latch member has a raised ridge extending along an upper surface thereof and the top latch member has a complementary channel extending along a lower surface thereof for receiving the seat belt therebetween with the ridge positioned in the channel and the seat belt clamped therebetween in a deformed, serpentine configuration for providing enhanced resistance against movement of the seat belt relative to the seat bottom.

3. A booster seat according to claim 2, wherein at least one or the other of the ridge or channel have teeth positioned thereon for engaging the seat belt clamped therein to provide further resistance against movement of the seat belt relative to the seat bottom.

4. A booster seat according to claim 1, and including a seat back carried by the seat bottom.

5. A booster seat according to claim 1, and including first and second arm rests carried by respective lateral first and second sides of the seat bottom and in vertically spaced-apart relation to the respective first and second latches.

6. A booster seat according to claim 1, wherein the bottom latch member is stationary and the top latch member is mounted for pivotal movement relative to the bottom latch member between the open position and the closed position.

7. A booster seat according to claim 1, and including a lock release handle carried by the top latch member for manual release of the top latch member from the bottom latch member.

8. A booster seat, comprising:
(a) a seat bottom for being supported on an upper surface of a vehicle seat, the seat bottom having a seat cushion and a removable seat cover positioned over the seat cushion;
(b) first and second latches carried by respective lateral first and second sides of the seat bottom for securing the seat to the upper surface of the vehicle seat by a vehicle seat belt, each of the first and second latches having a bottom latch member and a top latch member;
(I) the bottom latch member having a raised ridge extending along an upper surface thereof; and
(ii) the top latch member having a complementary channel extending along a lower surface thereof for receiving the seat belt therebetween with the ridge positioned in the channel and the seat belt clamped therebetween in a deformed, serpentine configuration for providing enhanced resistance against movement of the seat belt relative to the seat;
(c) the bottom latch member and the top latch member being movable relative to each other between an open position and a closed position for receiving and clamping a seat belt extended laterally across the seat bottom and the lap of the seat occupant, thereby securing the booster seat and the seat occupant to the upper surface of the vehicle seat;
(d) a seat back pivotally mounted on the seat bottom for providing support to the back of the seat occupant;
(e) a head rest mounted on the seat back and extending upwardly above the seat back for providing support to the head and neck of the seat occupant; and
(f) a lock for locking the bottom latch member and the top latch member together in the closed position, the lock comprising a locking extension carried by the top latch member and a locking extension receiving opening in the seat bottom for receiving and releasably retaining the locking extension therein.

9. A booster seat according to claim 8, and including a first and second belt guides carried on opposing lateral sides of the head rest for receiving and guiding a diagonally-extending shoulder seat belt strap across the torso of the seat occupant.

* * * * *